United States Patent [19]

Raab et al.

[11] Patent Number: 4,679,588

[45] Date of Patent: Jul. 14, 1987

[54] COMBINATION ROTARY ELECTRICAL SWITCH AND VACUUM SELECTOR VALVE

[75] Inventors: Andrew F. Raab, Morton Grove; Albert R. Cobb, III, Glenview, both of Ill.

[73] Assignee: Indak Manufacturing Corp., Northbrook, Ill.

[21] Appl. No.: 800,558

[22] Filed: Nov. 21, 1985

[51] Int. Cl.⁴ .................... F16K 33/44; H01H 9/06
[52] U.S. Cl. ........................ 137/560; 137/353; 251/250; 200/16 C; 200/61.68
[58] Field of Search ............ 251/250; 137/625.25, 137/625.48, 560, 353; 200/61.68, 16 C

[56] References Cited

U.S. PATENT DOCUMENTS

| | | | |
|---|---|---|---|
| 3,596,679 | 8/1971 | Sugden, Jr. | 137/625.68 |
| 3,637,962 | 1/1972 | Fiddler et al. | 200/61.86 |
| 3,942,555 | 3/1976 | Raab et al. | 200/61.86 |
| 4,054,761 | 10/1977 | Raab et al. | 200/61.86 |
| 4,126,153 | 11/1978 | Raab | 137/625.2 |
| 4,291,725 | 9/1981 | Raab et al. | 137/625.25 |
| 4,305,569 | 12/1981 | Raab et al. | 137/353 |

Primary Examiner—A. Michael Chambers
Attorney, Agent, or Firm—Burmeister, York, Palmatier, Hamby & Jones

[57] ABSTRACT

A single rotary shaft connected to a single rotary carriage operates a vacuum selector valve and two rotary electrical switches, in a casing having rear and front components. The valve comprises a valve carriage, slidable along a linear channel in the rear component. A gear rack on the valve carriage meshes with a pinion gear on the rotary carriage. The valve carriage is slidably retained in the valve channel by the switch contact plates of the first rotary switch. Such contact plates have terminal portions retained between the front and rear casing components. The contactors of the two switches face in opposite directions on the rotary carriage and are biased by a single coil spring, insulated from one of the contactors by a cup-shaped insulating member. The contact plates of the second switch are mounted on the front casing component and have terminals extending outside of the rear casing component through slots therein.

14 Claims, 13 Drawing Figures

COMBINATION ROTARY ELECTRICAL SWITCH AND VACUUM SELECTOR VALVE

FIELD OF THE INVENTION

This invention relates to a rotary control device which is a combination rotary electrical switch and vacuum selector valve, all operated by a single rotary shaft. The rotary control device is especially well adapted for controlling automotive heating and air conditioning systems, for use in automobiles, trucks and other vehicles, but the rotary control device will also find other applications.

BACKGROUND OF THE INVENTION

The assignee of the present application is the owner of several U.S. patents relating to prior control devices comprising electrical switches combined with vacuum selector valves, but in such prior devices, the movable operating members for the electrical switches and vacuum control valves have linear movement or lever action, and not rotary movement. Such prior patents include Raab and Cobb U.S. Pat. No. 3,942,555; Raab and Halstead U.S. Pat. No. 4,054,761; Raab U.S. Pat. No. 4,126,153; Raab and Halstead U.S. Pat. No. 4,251,698; Raab and Halstead U.S. Pat. No. 4,291,725; and Halstead and Black U.S. Pat. No. 4,448,390.

The problem has been presented of developing rotary action vacuum-electric control devices, combining electrical switches with vacuum control valves.

SUMMARY OF THE INVENTION

One object of the present invention is to provide a new and improved combined rotary action electrical switch and vacuum control valve device, which is highly effective and reliable in operation, and is capable of providing an extremely long service life, yet is extremely compact and inexpensive in construction.

Another object is to provide such a new and improved device, in which all of the electrical switching and vacuum control functions are carried out by rotating a single control shaft to a series of positions.

To achieve these and other objects, the present invention may provide a combination electrical switch and vacuum selector valve, comprising a casing, rotary carriage means including shaft means rotatable in the casing, such casing having bearing means for rotatably supporting such shaft means, a vacuum valve carriage including a vacuum valve member movable along a linear path in the casing, such casing having means forming a flat valve surface with valve ports extending out of the casing from such valve surface, such casing including a linear guide channel for receiving and guiding the valve carriage for linear sliding movement with the valve member in sliding engagement with such surface, the valve member including means for selectively affording communication between certain of the ports as the valve carriage is moved along the guide channel in the casing, the valve carriage having a gear rack thereon, the rotary carriage means including a pinion gear member meshing with the gear rack whereby rotary movement of the rotary carriage means produces linear movement of the valve carriage, a plurality of switch contact plates in the casing, at least one of the switch contact plates also being slidably engaged by the valve carriage member for slidably retaining the valve carriage member in the guide channel, and a switch contactor mounted on the rotary carriage means for movement therewith along a curved path, the contactor being slidably engageable with the switch contact plates for selectively affording electrical connections therebetween.

The casing preferably comprises front and rear components with latching means or other connecting means for connecting such components together. The linear guide channel is preferably included in the rear component. The switch contact plates preferably have first means, retained on the rear component, and second means, retained between the front and rear components, whereby the switch contact plates are held in stable positions for retaining the valve carriage member in the guide channel.

The first means may preferably comprise interlocking tab and slot means for retaining at least one of the switch contact plates on the rear component. The second means preferably include terminal means on the contact plates and retained between the front and rear components.

Such terminal means may preferably include U-shaped terminals, having end portions projecting outside the rear component, and intermediate flange portions retained between the front and rear components.

The rotary carriage means may comprise an insulating carriage member which supports first and second contactors, on opposite sides of the carriage member. The first contactor is on one side of the carriage member, confronting the previously mentioned switch contact plates. The first contactor is slidable along such contact plates, for selectively affording a connection therebetween. The second contactor is mounted on the opposite side of the carriage member, confronting second contact means, preferably in the form of second contact plates. The second contactor is slidable along the second contact plates and selectively forms a connection therebetween.

The control device preferably comprises spring means, which may include a coil spring acting between the first and second contactors for biasing such contactors toward the first and second contact plates. The spring means may preferably include electrical insulating means, such as an insulating member, interposed between one end of the coil spring and one of the switch contactors. Such insulating member may be cup-shaped, to form a nest for receiving the end of the coil spring. The insulating member may engage on contactor, while the opposite end of the coil spring engages the other contactor. Preferably, the coil spring extends through an opening in the rotary carriage member, whereby the carriage member supports and locates the coil spring.

The first set of contact plates is preferably mounted on the rear component of the casing, while the second set of contact plates is preferably mounted on the front component.

Both the first contact plates, mounted on the rear casing component, and the second contact plates, mounted on the front casing component, preferably have terminals extending out of the rear casing component, through slots therein. The terminals are adapted to receive an electrical connector.

All functions of the rotary control device are preferably controlled by a single rotary operating shaft, extending forwardly from the rotary carriage through a bearing in the front casing component. When the shaft is rotated, the pinion gear on the rotary carriage cooperates with the gear rack to produce linear movement of the valve carriage along the guide channel in the rear casing component. The valve member on the valve carriage cooperates with the valve ports for selectively establishing communication between certain of the valve ports at the various positions of the rotary shaft. The valve ports may be connected to a vacuum source, such as the intake manifold of an automotive engine, and to various vacuum operated devices, which may be employed to change the positions of doors or the like in an automotive heating and air conditioning system.

The valve carriage is retained in the guide channel by the first set of switch plates, mounted in the rear component of the casing. Thus, the switch plates have a dual function, serving both as switch contact plates and as retaining plates for slidably retaining the valve carriage in the linear valve channel.

The rotary movement of the control shaft causes the first contactor to slide along the first switch plates. The first contactor is mounted on the rear side of the rotary carriage, which is made of electrical insulating material. The first contactor selectively establishes electrical connections between the first switch plates, in various positions of the rotary control shaft.

The second contactor, mounted on the front side of the rotary carriage, is slidable along the second switch plates, mounted on the front component of the casing. The second contactor selectively establishes electrical connections between the second switch plates, in various positions of the rotary control shaft.

It is highly advantageous that both the first and second contactors are biased toward the first and second contact plates by the single coil spring, which acts between the contactors. The cup-shaped insulating member is interposed between one end of the coil spring and one of the contactors, to prevent the spring from establishing an electrical connection between the two contactors. The spring is supported and located within its opening in the rotary carriage.

The assembly of the control device is facilitated by the arrangement whereby the terminals of the first contact plates are retained between the front and rear components of the casing, which are secured together by latching elements thereon.

The rotary control device preferably comprises detent means for resiliently detaining the rotary carriage in a series of control positions. The rotary carriage member may have a series of detent notches, adapted to receive a detent ball which is biased by a coil spring.

BRIEF DESCRIPTION OF THE DRAWINGS

Further objects, advantages and features of the present invention will appear from the following description, taken with the accompanying drawings, in which.

DETAILED DESCRIPTION OF AN ILLUSTRATIVE EMBODIMENT

Figure 1:
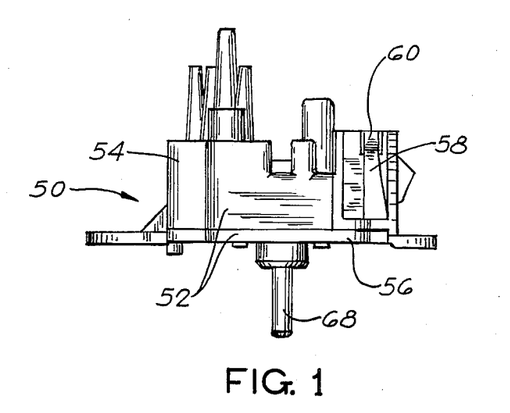
FIG. 1 is a plan view of a rotary control device, constituting a combination rotary electrical switch and vacuum selector valve, to be described as an illustrative embodiment of the present invention.
Figure 2:
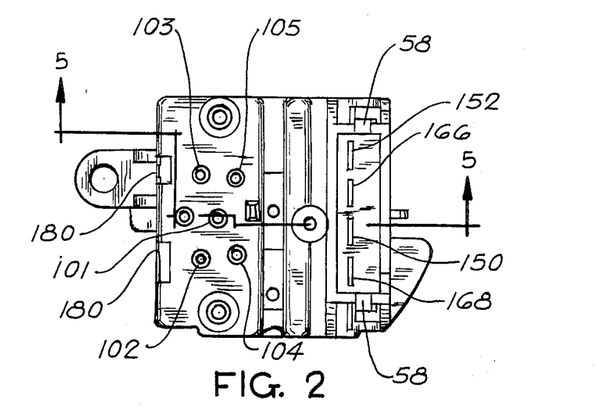
FIG. 2 is a rear elevation of the control device.
Figure 3:
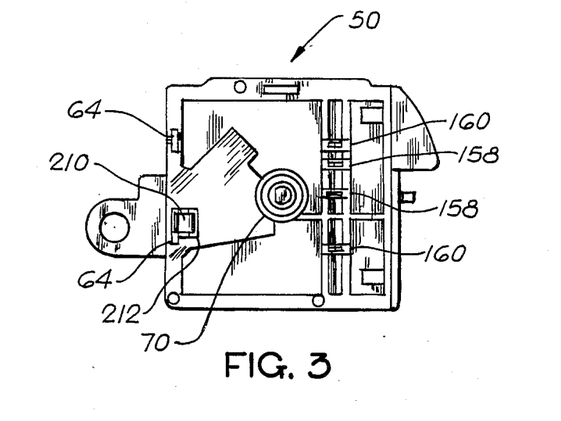
FIG. 3 is a front elevation.
Figure 4:
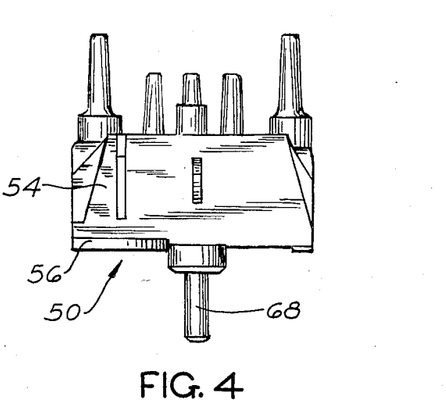
FIG. 4 is a side elevation.
Figures 5, 5A:
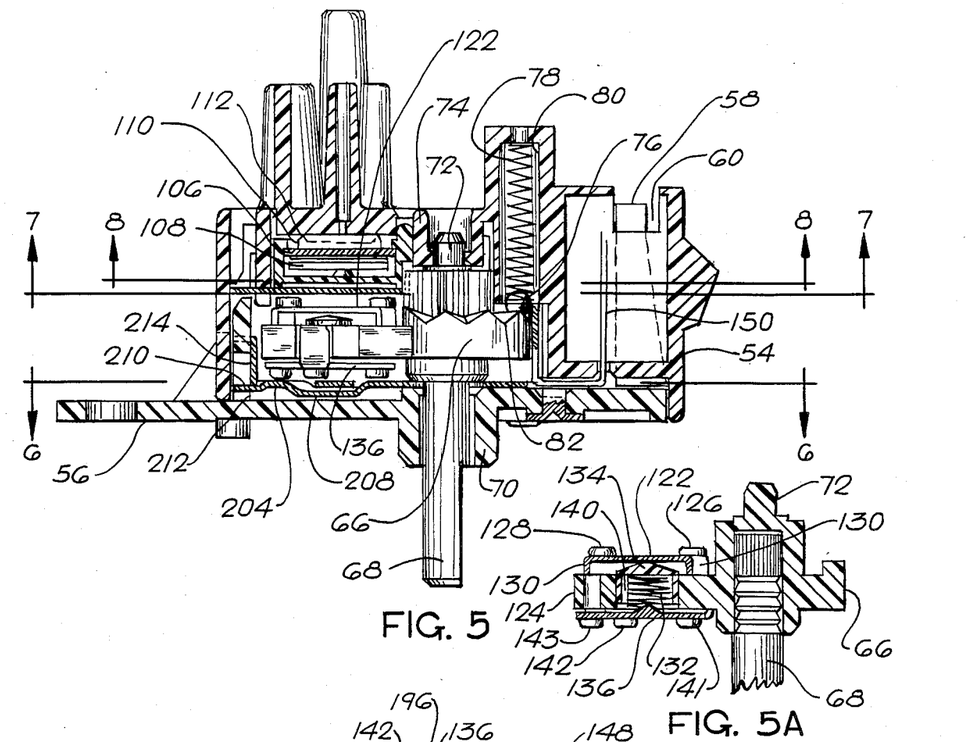
FIG. 5 is an enlarged section, taken generally along the line 5—5 in FIG. 2.
FIG. 5A is a fragmentary section, similar to a portion of FIG. 5, but showing the rotary carriage in section.
Figure 6:
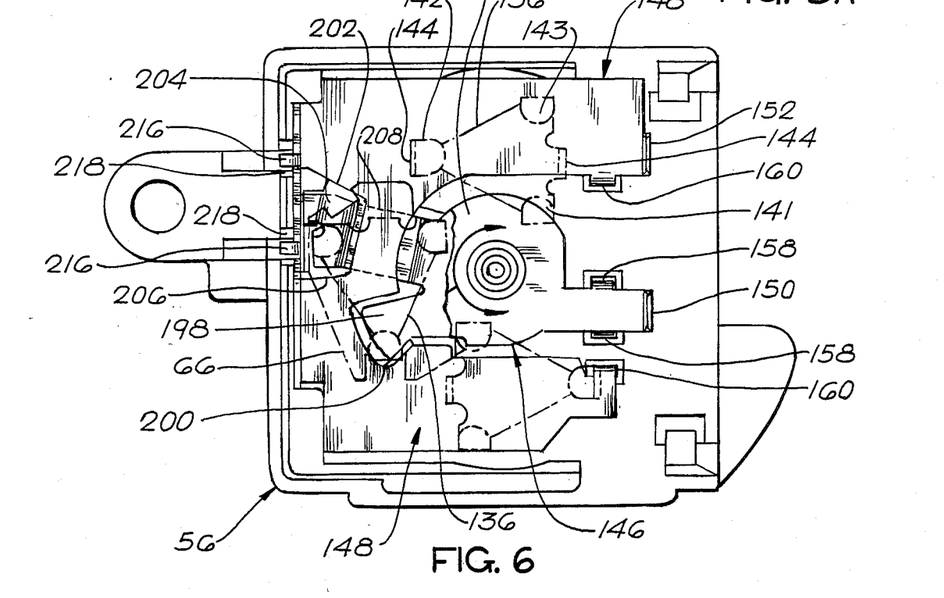
FIG. 6 is an enlarged elevation, taken as indicated by the line 6—6 in FIG. 5, and showing the front casing component, disassembled from the switch, with the front contact plates mounted on the front casing component, and with the front contactor shown in phantom.
Figure 7:
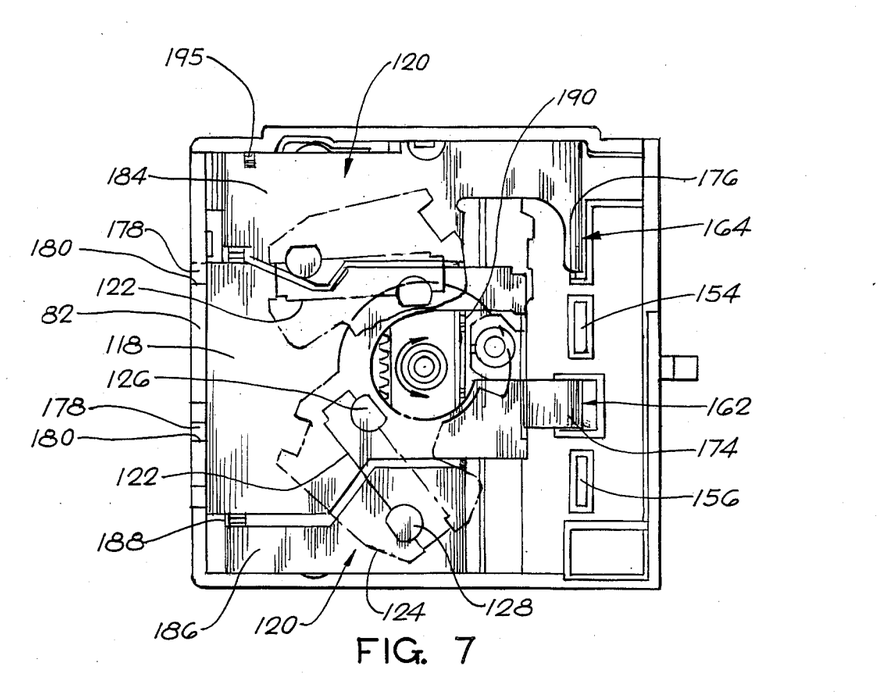
FIG. 7 is an elevation, taken generally as indicated by the line 7—7 in FIG. 5, and showing the rear casing component, disassembled from the device, with the rear contact plates and the valve carriage in place on the rear component, and with the rear contactor and the rotary carriage shown in phantom.
Figure 8:
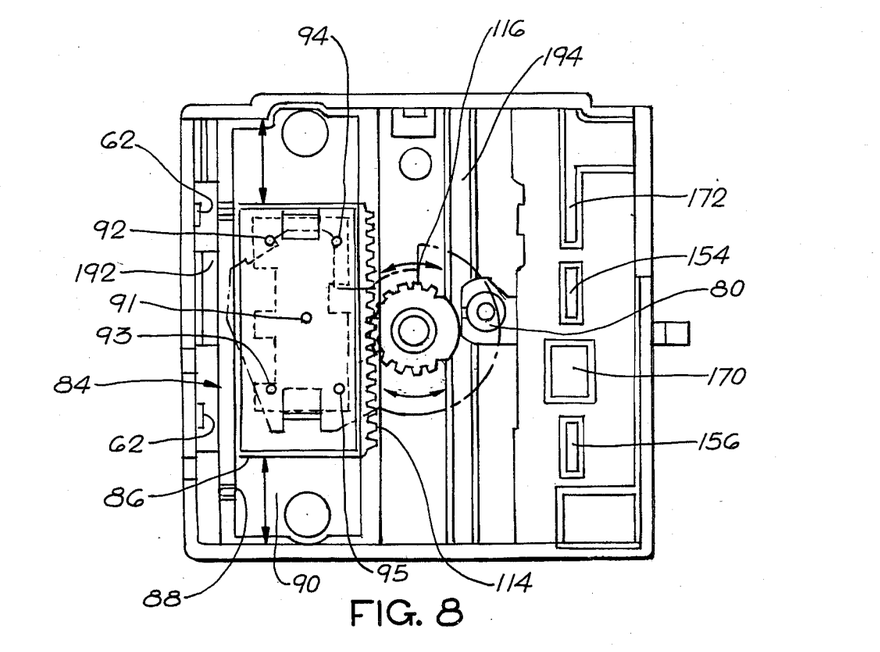
FIG. 8 is an elevation, taken generally as indicated by the line 8—8 in FIG. 5, and showing the rear casing component with the valve carriage in place, but with the rear contact plates removed.
Figure 9:
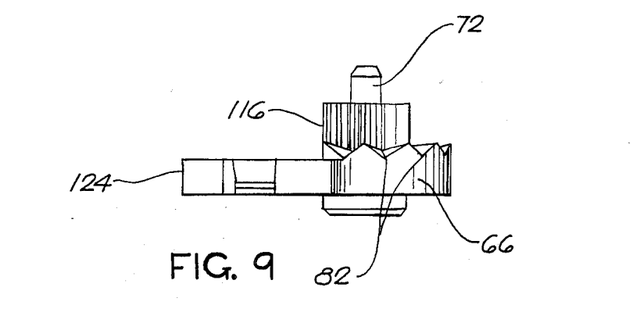
FIG. 9 is a plan view of the rotary carriage.
Figure 10:
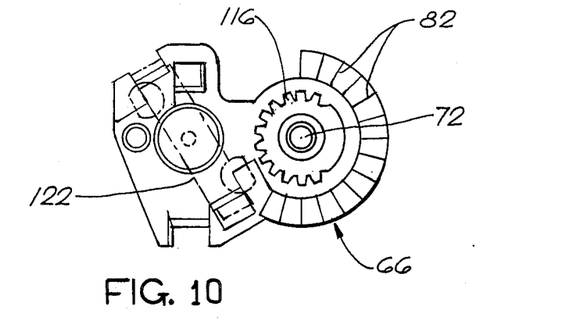
FIG. 10 is a rear elevation of the rotary carriage, with the rear contactor shown in phantom.
Figure 11:
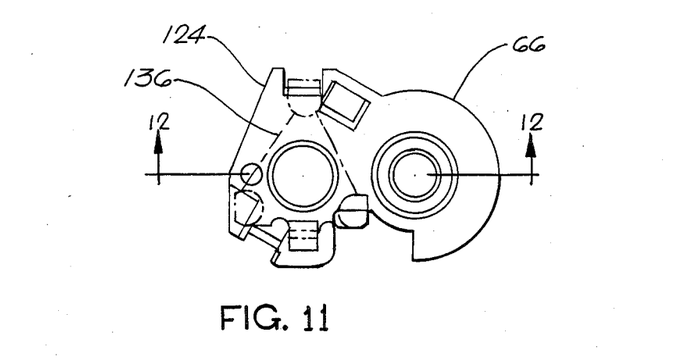
FIG. 11 is a front elevation of the rotary carriage, with the front contactor shown in phantom.
Figure 12:
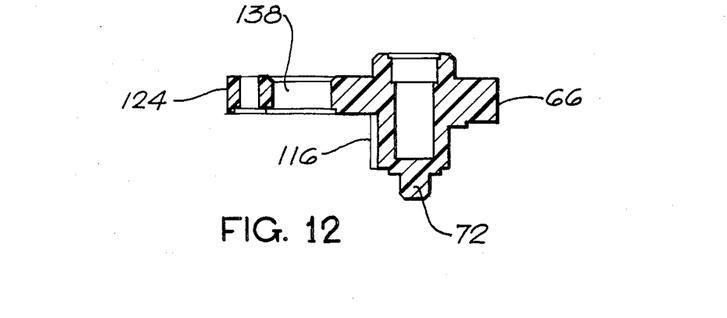
FIG. 12 is a section through the rotary carriage, taken generally along the line 12—12 in FIG. 11.

As just indicated, the drawings illustrate a rotary control device 50 constituting a combined rotary electrical switch and vacuum selector valve. The rotary control device 50 has a casing 52, preferably made of a suitble resinous plastic material which is capable of being intricately molded, and which is strong and resilient to afford good mechanical properties. The plastic material also affords electrical insulation and should be resistant to heat.

The casing 52 is hollow, to house the other components of the control device 50. As shown, the casing 52 compries rear and front components 54 and 56 with connecting means for connecting the components together. In general, the rear component 54 is constructed like a hollow box-like body, while the front component 56 is constructed like a front cover for the rear component 54. The two components 54 and 56 slide together during the assembly of the control device 50. The rear and front components 54 and 56 preferably have latching means for connecting the components together. Such latching means may include a pair of latching fingers 58, projecting rearwardly on the front component 56 and adapted to snap into latching slots 60 on the rear component 54. The latching means also may comprise latching teeth 62 on the rear component 54, adapted to snap into latching slots 64 on the front component 56.

The rotary control device 50 also comprises rotary carriage means having rotary shaft means, such rotary carriage means comprising a rotary carriage 66, rotatable within the casing 52, and fitted with a rotary operating shaft 68, which extends out of the casing 52 through a front bearing 70, formed on the front casing component 56. The rotary carriage 66 is preferably made of a suitable resinous plastic material which provides electrical insulation and is intricately moldable. The illustrated shaft 68 is made of metal and is pressed into or otherwise secured to the rotary carriage 66. The rotary carriage 66 includes a rearwardly projecting stub shaft 72 which is rotatably supported by a rear bearing 74 on the rear casing component 54.

In this instance, the rotary carriage 66 and the rotary operating shaft 68 are rotatable through a range of approximately one hundred eighty degrees. The rotary carriage 66 is resiliently detained in a series of control positions within this range, by detent means, preferably comprising a detent ball 76, biased against the rotary carriage 66 by a coil spring 78. A nest 80 is formed in the rear casing component 54 to receive the detent ball 76 and the coil spring 78. The detent ball 76 is engageable with a series of detent notches 82 in the rotary carriage 66.

The rotary control device 50 has vacuum selector valve means 84, supported by the rear casing component 54 and operable by the rotary carriage 66. Such vacuum selector valve means may comprise a valve carriage 86 which is movable along a linear path in a linear guide channel 88, formed in the rear component 54. The rear wall portion of the guide channel 88 affords a flat, linear valve surface 90 which is perforated to form an array of valve ports, extending rearwardly out of the rear casing component 54. In this instance, there are five valve ports 91, 92, 93, 94 and 95, connecting with five rearwardly projecting nipples 101, 102, 103, 104 and 105 on the rear casing component 54. The nipples 101-105 are adapted to receive a conventional vacuum connector device, not shown.

The valve carriage 86 is constructed like a rearwardly opening box or tray and is adapted to receive a valve member 106 and a leaf spring 108 which biases the valve member 106 against the valve surface 90, for sliding movement along the valve surface. The valve member 106 has a rubber-like rear component 110, made of a soft, resilient material, such as silicone rubber or the like, and formed with a complex maze-like ridge 112 which slides along the valve surface 90 and selectively interconnects the various valve ports 91-95 at various positions of the valve member 106.

The rotary control device 50 is provided with driving means, whereby rotation of the rotary carriage 66 produces linear movement of the valve carriage 86. Thus, a gear rack 114 is formed on the valve carriage 86 and is in meshing engagement with a pinion gear 116, formed as part of the rotary carriage 66. When the rotary carriage 66 is rotated through approximately one hundred eighty degrees, the pinion gear 116 drives the gear rack 114 and causes linear movement of the valve carriage 86 along the length of the guide channel 88.

The rotary control device 50 also comprises first and second electrical switching means, operable by rotation of the rotary carriage 66. The first switching means may comprise first switch contact plates 118 and 120, mounted on the rear casing component 54. Portions of the switch contact plates 118 and 120 also slidably engage the front surface of the valve carriages 86, for retaining the valve carriage in the linear guide channel 88. The sliding engagement between the valve carriage 86 and the switch contact plates 118 and 120 is such as to maintain the valve carriage 86 along a linear path, so that the leaf spring 108 is partially compressed, so that the valve member 106 is biased against the valve surface 90.

The first switch contact plates 118 and 120 face forwardly and are slidably engageable by a first electrical contactor 122, mounted on the rotary carriage 66, which has an arm 124 for supporting the contactor 122. It will be seen that the contactor 122 is in the form of an electrically conductive bridging plate having two rearwardly projecting protuberances or contactor points 126 and 128, for slidably engaging the contact plates 118 and 120, to connect the contact plates together electrically, in various positions of the rotary carriage 66. The contactor 122 is positioned on the rear side of the supporting arm 124 and is formed with a pair of retaining tabs or prongs 130 which are slidably retained on the arm 124, so that the contactor 122 can be resiliently biased toward the contact plates 118 and 120.

The resilient biasing action is provided by spring means, illustrated as comprising a coil spring 132, fitted with an insulating member 134, so that the coil spring can also serve as the biasing means for a second switch contactor 136, mounted on the front side of the supporting arm 124. The coil spring 132 extends through an opening 138 in the supporting arm 124. Such opening 138 locates the coil spring 132 in the proper position on the supporting arm 124. The insulating member 134 is cup-shaped, so as to provide a nest 140 therein, for receiving one end of the coil spring 132. The insulating member 134 may be made of a suitable resinous plastic material.

The second switch contactor 136 is in the form of an electrically conductive bridging plate having three forwardly projecting protuberances or contactor points 141, 142 and 143, for slidably engaging second switch contact means, mounted on the front casing component 56. The second switch contactor 136 has a pair of rearwardly projecting tabs or prongs 144 which are slidably retained on the supporting arm 124.

As shown, the second contact means comprise second contact plates 146 and 148, mounted on the front casing component 56. The contact plates 146 and 148 are slidably engageable by the second contactor points 141-143, for selectively connecting the plates together electrically, in various positions of the rotary carriage 66.

The second or front contact plates 146 and 148 are provided with respective rearwardly projecting terminals 150 and 152 which project outside of the rear casing component 54, through slots 154 and 156 therein. In the general neighborhood of the terminals 150 and 152, the contact plates 146 and 148 have pairs of staking tabs 158 and 160 which extend through slots in the front casing component 56 and are staked in place.

The first or rear contact plates 118 and 120 are formed with U-shaped terminal members 162 and 164, including end portions or terminals 166 and 168 which project rearwardly outside the rear casing member 54, through slots 170 and 172 therein. The four terminals 140, 142, 166 and 168 are adapted to receive an electrical connector plug, not shown. The U-shaped terminal members 162 and 164 have intermediate portions 174 and 176 which are retained between the rear and front casing components 54 and 56, when they are fully assembled.

The rear contact plate 118 is provided with tabs 178 which interlock with slots 180 in one side wall 182 of the rear casing component 54. The interlocking tabs 178 and slots 180 insure that the contact plate 118 is held in a stable position, so that the contact plate 118 properly functions as a retainer for the slidable valve carriage 86, which slidably engages the rear side of the contact plate 118.

The other rear contact plate 120 has two plate portions 184 and 186, connected together by two flanges 188 and 190 which are recessed into grooves 192 and 194 in the rear casing component 54. In this way, the contact plate 120 is accurately located on the rear component 54. The plate 120 is formed with a forwardly struck projection 195 which is retained between the rear and front casing components 54 and 56.

The first or rear switching means, comprising the rear contanct plates 118 and 120 and the rear contactor 122, may be employed very advantageously to control the energization of the air conditioning clutch in an automotive heating and air conditoning system. The clutch is energized in those positions of the contactor 122 in which the contactor bridges between the first contact plate 118 and the two separated portions 184 and 186 of the second contact plate 120. In other positions of the contactor 122, when the contactor does not bridge between the contact plates 118 and 120, the air conditioning clutch is not energized.

The second or front switching means, comprising the second contactor 136 and the second contact plates 146 and 148, may be employed very advantageously to control the electrical energization of the blower motor for the automotive heating and air conditioning system. When the contactor 136 bridges between the contact plates 146 and 148, the blower motor is energized.

It is very advantageous to employ the same coil spring 132 for biasing both contactors 122 and 136. The insulating member 134, which is interposed between the spring 132 and one of the contactors, prevents the spring from establishing an electrical connection between the two contactors.

As shown, the front contact plate 146 has an inner, circular portion 196 which is engaged at all times by the innermost contactor point 141. The contact plate 146 has a first radial arm 198 which is engaged in one position of the contactor 36 by the second contactor point 142. In other positions of the contactor 136, the contactor point 142 engages the larger contact plate 148. A notch 200 is formed in the larger contact plate 148 to afford clearance for the first radial arm 198 of the contact plate 146.

The smaller contact plate 146 also has a second radial arm 202, with an outer contact portion 204 which is engaged by the third or outermost contactor point 143, in one position of the contactor 136. The larger contact plate 148 is formed with a notch 206, in its outer portion, affording clearance for the outer contact portion 204. The second radial arm 202 has an intermediate portion 208 which is offset forwardly and is recessed into the front casing component 56, to avoid any electrical contact between the intermediate portion 208 and the larger contact plate 148. The extreme outer end of the second radial arm 202 takes the form of a forwardly offset tab 210 which interlocks with a slot 212, formed in the front casing component 56. In this way, the arm 202 is accurately located and is securely held against any possible electrical contact with the larger contact plate 148.

As shown, the larger contact plate 148 is formed with a rearwardly projecting flange 214 having outwardly projecting tabs 216, extending into locating slots 218 in the front casing component 56. The flange 214 is notched out to avoid any possible electrical contact with the contact portion 204 of the arm 202.

In one position of the second contactor 136, all three contactor points 141, 142 and 143 engage portions of the smaller contact plate 146, to provide an "OFF" position. The innermost contact point 141 engages the inner circular portion 196 of the plate 146. The second contactor point 142 engages the radial arm 198. The outermost contactor point 143 engages the contact portion 204 of the second radial arm 202. When the contactor 136 is moved in either direction of rotation from this "OFF" position, the contactor points 142 and 143 engage the larger contact plate 148, so that the contactor 136 bridges between the contact plate 146 and 148. With this construction, the contactor points 142 and 143 provide dual simultaneous breaking of the electrical circuit, so that the wear on the contactor points and the contact plates, due to arcing, is spread between the two break zones. In this way, the life of the switch is substantially prolonged.

The rotary control device 50 is extremely compact, despite the fact that it incorporates a vacuum selector valve and two rotary electrical switches. All of the functions are controlled by the rotation of a single shaft.

We claim:

1. A combination electrical switch and vacuum selector valve, comprising
   a casing,
   rotary carriage means including shaft means rotatable in the casing,
   such casing having bearing means for rotatably supporting such shaft means,
   a vacuum valve carriage including a vacuum valve member movable along a linear path in the casing,
   such casing having means forming a flat valve surface with valve ports extending out of the casing from such valve surface,
   such casing including a linear guide channel for receiving and guiding the valve carriage for linear sliding movement with the valve member in sliding engagement with such surface,
   the valve member including means for selectively affording communication between certain of the ports as the valve carriage is moved along the guide channel in the casing,
   the valve carriage having a gear rack thereon,
   the rotary carriage means including a pinion gear member meshing with the gear rack whereby rotary movement of the rotary carriage means produces linear movement of the valve carriage,
   a plurality of switch contact means mounted in the casing,
   and a switch contactor mounted on the rotary carriage means for movement therewith along a curved path,
   the contactor being slidably engageable with the switch contact means for selectively affording electrical connections therebetween,
   such switch contact means including at least one switch contact plate,
   such casing and such switch contact plate having means for holding such switch contact plate in a stable position in such casing with such valve carriage slidably engaging such switch contact plate,
   such switch contact plate comprising means for slidably retaining the valve carriage in the guide channel with the valve member in operative sliding engagement with the valve surface.

2. A combination electrical switch and vacuum selector valve device, comprising
   a casing,
   rotary carriage means including shaft means rotatable in the casing,
   such casing having bearing means for rotatably supporting such shaft means,
   a vacuum valve carriage including a vacuum valve member movable along a linear path in the casing,
   such casing having means forming a flat valve surface with valve ports extending out of the casing from such valve surface,
   such casing including a linear guide channel for receiving and guiding the valve carriage for linear sliding movement with the valve member in sliding engagement with such surface, the valve member including means for selectively affording communication between certain of the ports as the valve carriage is moved along the guide channel in the casing, the valve carriage having a gear rack thereon, the rotary carriage means including a pinion gear member meshing with the gear rack whereby rotary movement of the rotary carriage means produces linear movement of the valve carriage, a plurality of first switch contact means mounted in the casing, a first switch contactor mounted on the rotary carriage means for movement therewith along a curved path, the contactor being slidably engageable with the switch contact means for selectively affording electrical connections therebetween, the first switch contactor being mounted on one side of the rotary carriage means confronting the first switch contact means, the rotary carriage means having an opposite side with a second switch contactor mounted thereon and movable with the rotary carriage means along a second curved path, and second switch contact means in the casing and slidably engageable by the second switch contactor for selectively establishing electrical connections between the second switch contact means, such first switch contact means including at least one switch contact plate, such casing and such switch contact plate having means for holding such switch contact plate in a stable position in such casing with such valve carriage slidably engaging such switch contact plate, such switch contact plate comprising means for slidably retaining the valve carriage in the guide channel with the valve member in operative sliding engagement with the valve surface.

3. A device according to claim 2, including spring means acting between the first and second contactors for biasing the first contactor toward the switch contact plates while biasing the second contactor toward the second contact means, the spring means including electrical insulating means to prevent the spring means from establishing any electrical connection between the contactors.

4. A device according to claim 2, including electrically insulating spring means acting between the first and second contactors for biasing the first contactor toward the switch contact plates while biasing the second contactor toward the second contact means, the electrically insulating spring means including a coil spring and an insulating member connected between the first and second contactors.

5. A device according to claim 4, in which the insulating member is cup-shaped and forms a nest for receiving one end of the coil spring, the insulating member being interposed between the coil spring and one of the contactors.

6. A device according to claim 4, the rotary carriage means being formed with an opening for receiving and locating the coil spring in its position between the contactors, the insulating member being interposed between one end of the coil spring and one of the contactors.

7. A combination electrical switch and vacuum selector valve, comprising a casing, rotary carriage means including shaft means rotatable in the casing, such casing having bearing means for rotatably supporting such shaft means, a vacuum valve carriage including a vacuum valve member movable along a linear path in the casing, such casing having means forming a flat valve surface with valve ports extending out of the casing from such valve surface, such casing including a linear guide channel for receiving and guiding the valve carriage for linear sliding movement with the valve member in sliding engagement with such surface, the valve member including means for selectively affording communication between certain of the ports as the valve carriage is moved along the guide channel in the casing, the valve carriage having a gear rack thereon, the rotary carriage means including a pinion gear member meshing with the gear rack whereby rotary movement of the rotary carriage means produces linear movement of the valve carriage, a plurality of switch contact plates in the casing, at least one of the switch contact plates also being slidably engaged by the valve carriage for slidably retaining the valve carriage in the guide channel, and a switch contactor mounted on the rotary carriage means for movement therewith along a curved path, the contactor being slidably engageable with the switch contact plates for selectively affording electrical connections therebetween, such casing comprising front and rear components with connecting means for connecting such components together, the linear guide channel being included in the rear component, the switch contact plates having first means retained on the rear component, the switch contact plates having second means retained between the front and rear components, whereby the switch contact plates are held in stable positions for retaining the valve carriage in the guide channel.

8. A combination electrical switch and vacuum selector valve, comprising a casing, rotary carriage means including shaft means rotatable in the casing, such casing having bearing means for rotatably supporting such shaft means, a vacuum valve carriage including a vacuum valve member movable along a linear path in the casing, such casing having means forming a flat valve surface with valve ports extending out of the casing from such valve surface, such casing including a linear guide channel for receiving and guiding the valve carriage for linear sliding movement with the valve member in sliding engagement with such surface, the valve member including means for selectively affording communication between certain of the ports as the valve carriage is moved along the guide channel in the casing, the valve carriage having a gear rack thereon, the rotary carriage means including a pinion gear member meshing with the gear rack whereby rotary movement of the rotary carriage means produces linear movement of the valve carriage, a plurality of switch contact plates in the casing, at least one of the switch contact plates also being slidably engaged by the valve carriage for slidably retaining the valve carriage in the guide channel, and a switch contactor mounted on the rotary carriage means for movement therewith along a curved path, the contactor being slidably engageable with the switch contact plates for selectively affording electrical connections therebetween, such casing comprising front and rear components with latching means for securing the components together, the linear guide channel being included in the rear component, the switch contact plates and the rear component including interlocking tab and slot means for retaining at least one of the switch contact plates on the rear component, the contact plates including terminal means retained between the front and rear components, whereby the switch contact plates are held in stable positions in the casing for retaining the valve carriage in the guide channel.

9. A combination electrical switch and vacuum selector valve according to claim 8, such terminal means including U-shaped terminals on the contact plates, the U-shaped terminals having end portions projecting outside the rear component, the terminals having intermediate flange portions retained between the front and rear components.

10. A combination electrical switch and vacuum selector valve device, comprising a casing, rotary carriage means including shaft means rotatable in the casing, such casing having bearing means for rotatably supporting such shaft means, a vacuum valve carriage including a vacuum valve member movable along a linear path in the casing, such casing having means forming a flat valve surface with valve ports extending out of the casing from such valve surface, such casing including a linear guide channel for receiving and guiding the valve carriage for linear sliding movement with the valve member in sliding engagement with such surface, the valve member including means for selectively affording communication between certain of the ports as the valve carriage is moved along the guide channel in the casing, the valve carriage having a gear rack thereon, the rotary carriage means including a pinion gear member meshing with the gear rack whereby rotary movement of the rotary carriage means produces linear movement of the valve carriage, a plurality of switch contact plates in the casing, at least one of the switch contact plates also being slidably engaged by the valve carriage for slidably retaining the valve carriage in the guide channel, a first switch contactor mounted on the rotary carriage means for movement therewith along a curved path, the contactor being slidably engageable with the switch contact plates for selectively affording electrical connections therebetween, the first switch contactor being mounted on one side of the rotary carriage means confronting the switch contact plates, the rotary carriage means having an opposite side with a second switch contactor mounted thereon and movable with the rotary carriage means along a second curved path, second switch contact means in the casing and slidably engageable by the second switch contactor for selectively establishing electrical connectons between the second switch contact means.

and electrically insulating spring means acting between the first and second contactors for biasing the first contactor toward the switch contact plates while biasing the second contactor toward the second contact means, the electrically insulating spring means including a coil spring and an insulating member connected between the first and second contactors.

such casing comprising front and rear components and connecting means for connecting the front and rear components together, the linear guide channel being included in the rear component, the switch contact plates being mounted on the rear component and having means retained between the front and rear components, the second contact means being mounted on the front component.

11. A combination electrical switch and vacuum selector valve device, comprising a casing, rotary carriage means including shaft means rotatable in the casing, such casing having bearing means for rotatably supporting such shaft means, a vacuum valve carriage including a vacuum valve member movable along a linear path in the casing, such casing having means forming a flat valve surface with valve ports extending out of the casing from such valve surface, such casing including a linear guide channel for receiving and guiding the valve carriage for linear sliding movement with the valve member in sliding engagement with such surface, the valve member including means for selectively affording communication between certain of the ports as the valve carriage is moved along the guide channel in the casing, the valve carriage having a gear rack thereon, the rotary carriage means including a pinion gear member meshing with the gear rack whereby rotary movement of the rotary carriage means produces linear movement of the valve carriage, a plurality of switch contact plates in the casing, at least one of the switch contact plates also being slidably engaged by the valve carriage for slidably retaining the valve carriage in the guide channel, a first switch contactor mounted on the rotary carriage means for movement therewith along a curved path, the contactor being slidably engageable with the switch contact plates for selectively affording electrical connections therebetween, the first switch contactor being mounted on one side of the rotary carriage means confronting the switch contact plates, the rotary carriage means having an opposite side with a second switch contactor mounted thereon and movable with the rotary carriage means along a second curved path, and second switch contact means in the casing and slidably engageable by the second switch contactor for selectively establishing electrical connections between the second switch contact means, such casing including front and rear components with latching means for connecting the front and rear components together, the flat valve surface and the linear guide channel being included in the rear component, the switch contact plates being mounted on the rear component, the switch contact plates having certain means interlocking with the rear component and other means retained between the front and rear components, the other means including terminals extending outside of the rear component, the second contact means being mounted on the front component and including second terminal means extending outside of the rear component.

12. A combination electrical switch and vacuum selector valve, comprising a casing, rotary carriage means including shaft means rotatable in the casing, such casing having bearing means for rotatably supporting such shaft means, a vacuum valve carriage including a vacuum valve member movable along a linear path in the casing, such casing having means forming a flat valve surface with valve ports extending out of the casing from such valve surface, such casing including a linear guide channel for receiving and guiding the valve carriage for linear sliding movement with the valve member in sliding engagement with such surface, the valve member including means for selectively affording communication between certain of the ports as the valve carriage is moved along the guide channel in the casing, the valve carriage having a gear rack thereon, the rotary carriage means including a pinion gear member meshing with the gear rack whereby rotary movement of the rotary carriage means produces linear movement of the valve carriage, a plurality of switch contact plates mounted in the casing, and a switch contactor mounted on the rotary carriage means for movement therewith along a curved path, the contactor being slidably engageable with the switch contact plates for selectively affording electrical connections therebetween, such casing and such switch contact plates having means for holding such switch contact plates in stable positions in such casing with such valve carriage slidably engaging such switch contact plates, such switch contact plates comprising means for slidably retaining the valve carriage in the guide channel with the valve member in operative sliding engagement with the valve surface.

13. A combination electrical switch and vacuum selector valve, comprising a casing, rotary carriage means including shaft means rotatable in the casing, such casing having bearing means for rotatably supporting such shaft means, a vacuum valve carriage including a vacuum valve member movable along a linear path in the casing, such casing having means forming a flat valve surface with valve ports extending out of the casing from such valve surface, such casing including a linear guide channel for receiving and guiding the valve carriage for linear sliding movement with the valve member in sliding engagement with such surface, the valve member including means for selectively affording communication between certain of the ports as the valve carriage is moved along the guide channel in the casing, the valve carriage having a gear rack thereon, the rotary carriage means including a pinion gear member meshing with the gear rack whereby rotary movement of the rotary carriage means produces linear movement of the valve carriage, a plurality of switch contact plates mounted in the casing, and a switch contactor mounted on the rotary carriage means for movement therewith along a curved path, the contactor being slidably engageable with the switch contact plates for selectively affording electrical connections therebetween, such casing comprising front and rear components with connecting means for connecting such components together, the linear guide channel being included in the rear component, such casing and such switch contact plates having means for holding such switch contact plates in stable positions on such rear component with such valve carriage slidably engaging such switch contact plates, such switch contact plates comprising means for slidably retaining the valve carriage in the guide channel with the valve member in operative sliding engagement with the valve surface.

14. A combination electrical switch and vacuum selector valve, comprising a casing, rotary carriage means including shaft means rotatable in the casing, such casing having bearing means for rotatably supporting such shaft means, a vacuum valve carriage including a vacuum valve member movable along a linear path in the casing, such casing having means forming a flat valve surface with valve ports extending out of the casing from such valve surface, such casing including a linear guide channel for receiving and guiding the valve carriage for linear sliding movement with the valve member in sliding engagement with such surface, the valve member including means for selectively affording communication between certain of the ports as the valve carriage is moved along the guide channel in the casing, the valve carriage having a gear rack thereon, the rotary carriage means including a pinion gear member meshing with the gear rack whereby rotary movement of the rotary carriage means produces linear movement of the valve carriage, a plurality of switch contact means mounted in the casing, and a switch contactor mounted on the rotary carriage means for movement therewith along a curved path, the contactor being slidably engageable with the switch contact means for selectively affording electrical connections therebetween, such casing comprising front and rear components with connecting means for connecting such components together, the linear guide channel being included in the rear component, such switch contact means including at least one switch contact plate, such casing and such switch contact means having means for holding such switch contact means in stable positions on such rear component with such valve carriage slidably engaging such switch contact plate, such switch contact plate comprising means for slidably retaining the valve carriage in the guide channel with the valve member in operative sliding engagement with the valve surface.

* * * * *